(No Model.) 4 Sheets—Sheet 1.

J. W. HYATT.
APPARATUS FOR FILTERING.

No. 404,708. Patented June 4, 1889.

Attest:
L. Lee
F. C. Fischer

Inventor.
John W. Hyatt
per Crane & Miller (No Model.) 4 Sheets—Sheet 3.

J. W. HYATT.
APPARATUS FOR FILTERING.

No. 404,708. Patented June 4, 1889.

Inventor.
L. Lee.
F. C. Fischer.

Inventor.
John W. Hyatt
per Crane & Miller, Atty.

(No Model.) 4 Sheets—Sheet 4.
J. W. HYATT.
APPARATUS FOR FILTERING.
No. 404,708. Patented June 4, 1889.
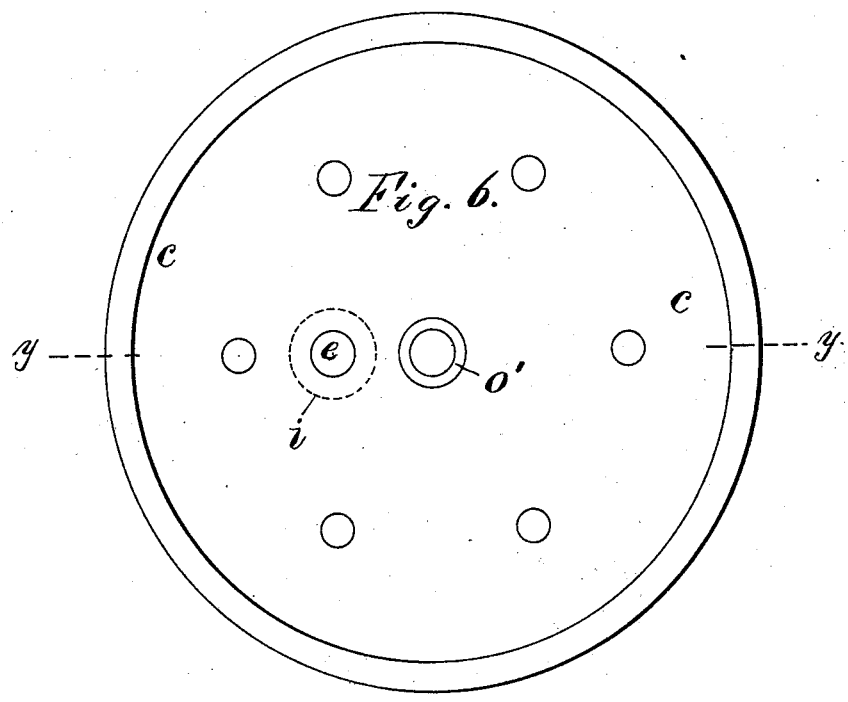
Fig. 6.
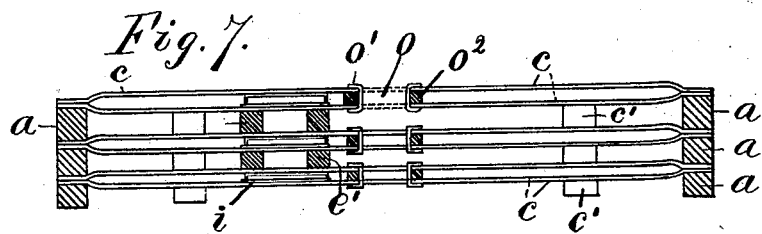
Fig. 7.
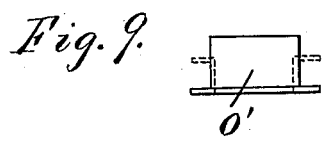
Fig. 9.
Fig. 8.
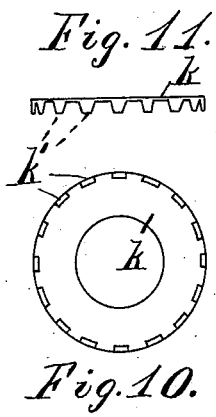
Fig. 11.
Fig. 10.
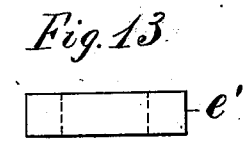
Fig. 13.
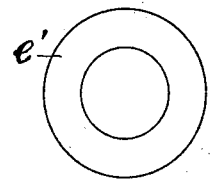
Fig. 12.
Attest.
L. Lee.
F. C. Fischer.
Inventor.
John W. Hyatt, per
Crane & Miller, Attys.

UNITED STATES PATENT OFFICE.

JOHN W. HYATT, OF NEWARK, NEW JERSEY.

APPARATUS FOR FILTERING.

SPECIFICATION forming part of Letters Patent No. 404,708, dated June 4, 1889.

Application filed October 11, 1888. Serial No. 287,852. (No model.)

*To all whom it may concern:*

Be it known that I, JOHN W. HYATT, a citizen of the United States, residing at Newark, Essex county, New Jersey, have invented certain new and useful Improvements in Apparatus for Filtering, fully described and represented in the following specification and the accompanying drawings, forming a part of the same.

The object of this invention is to utilize thin or flexible sheets of filtering material and to support the same during the filtering operation, so as to sustain the pressure upon their surface and to combine a large area of such filter-sheets within a casing.

My invention is particularly adapted for use with the filtering material claimed in my application No. 287,851, filed herewith, and for cleansing the surfaces of the same by loose granular material in the methods heretofore patented to me.

In the simplest form of my invention the pressure upon the flexible medium is sustained by a backing of porous material, as saw-dust, rice matting, gravel, or analogous substances, two sheets being preferably secured together with the backing placed between them, and the fluid to be filtered pressed upon their outer surfaces, so that the pressure upon one sheet balances that upon the other, and the filtered fluid flows away between them through the interposed substance and is conducted away by a suitable outlet. In this part of my invention it is obviously immaterial how the unfiltered fluid is applied to the filtering medium, or how the fluid-outlet is connected with the interspace.

My invention also consists in particular means of combining two of such flexible sheets together at their edges and at the filter-outlet, and also in means for combining a large number of such pairs of sheets in a single filter.

Figure 1:
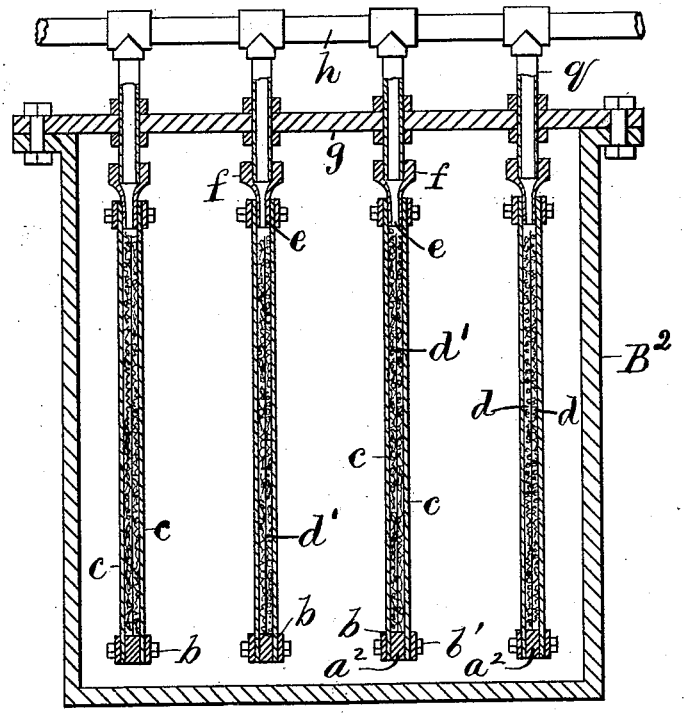
Figure 2:
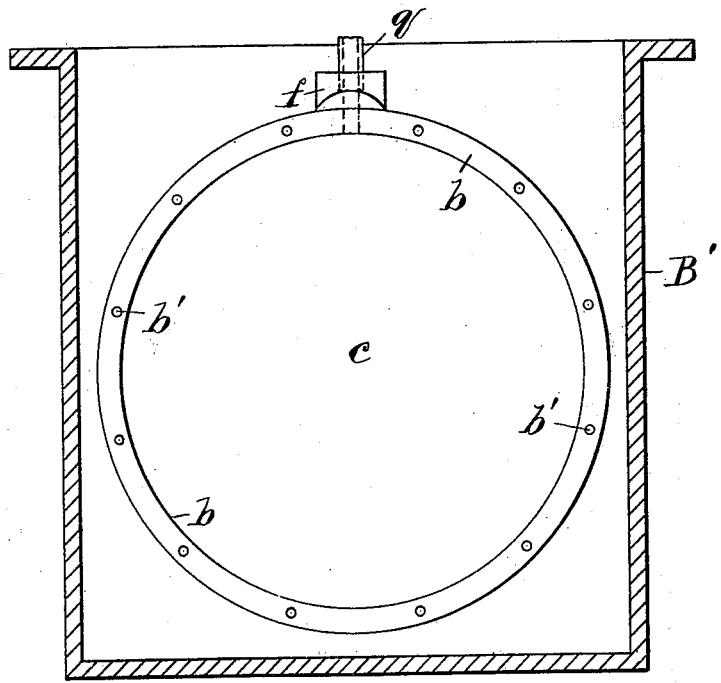
Figure 3:
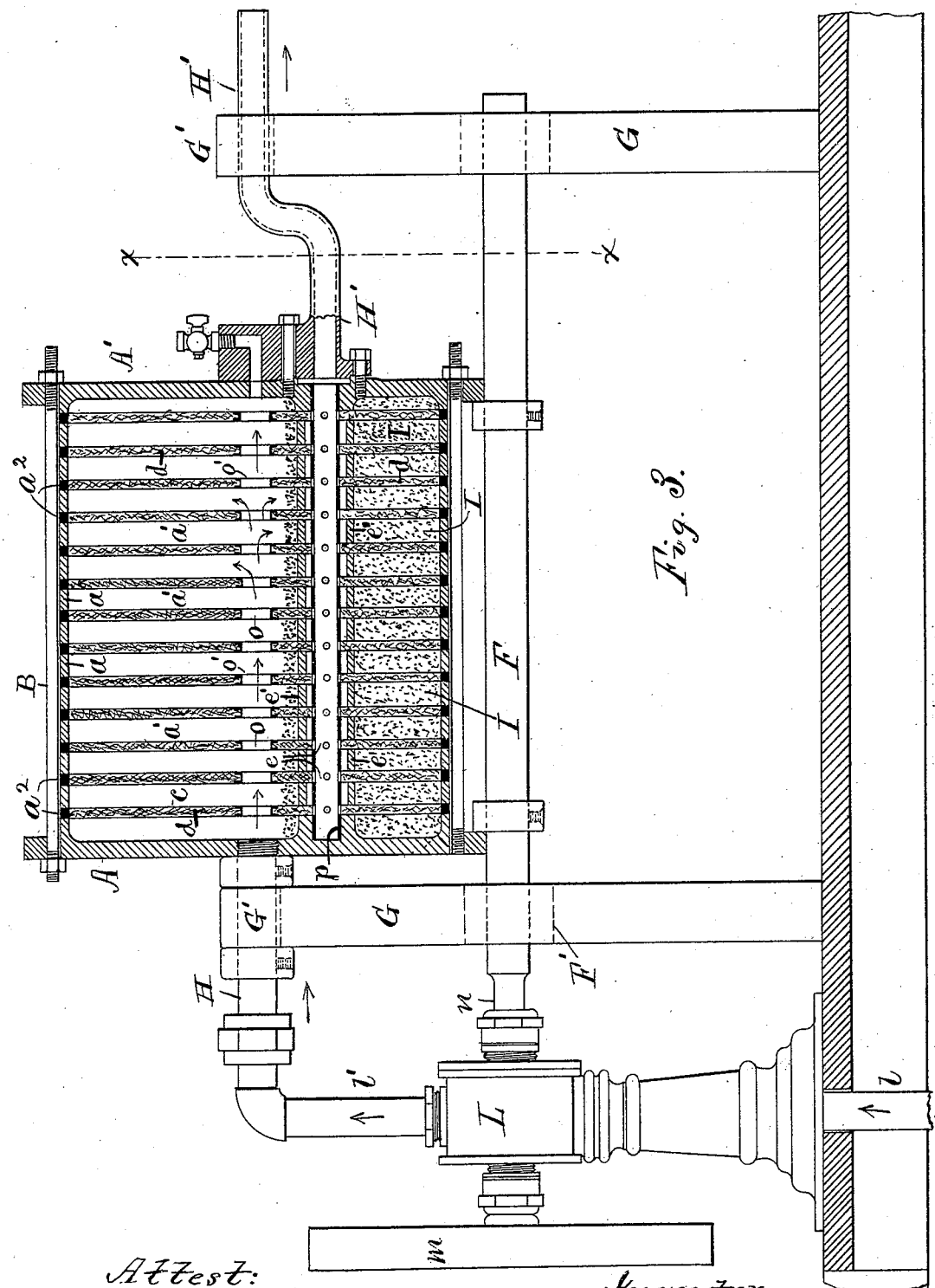
Figure 4:
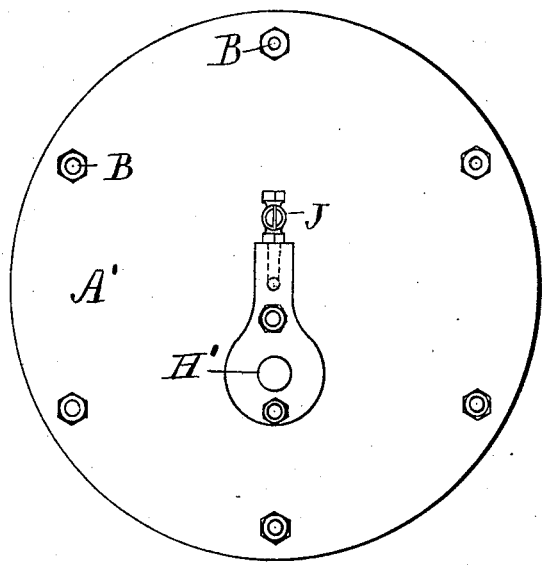
Figure 5:
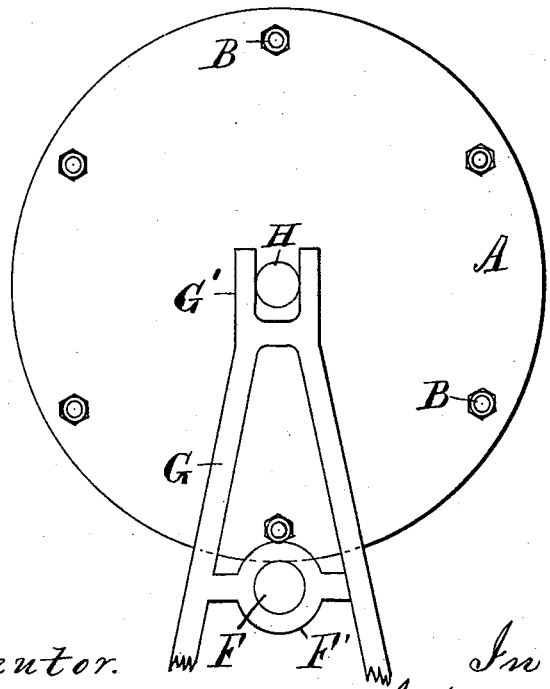

In the annexed drawings, Figure 1 is a section of a filter containing four such pairs of sheets, the view being taken transverse to the sheets through the center of the several outlets. Fig. 2 is a section of the casing, taken at right angles to that in Fig. 1, showing a side view of one of such pairs. Fig. 3 is a side elevation, partly in section on the center line where hatched, of a filtering apparatus having a rotary casing with granular material applied between the several pairs to abrade and cleanse the filtering-surfaces. Fig. 4 is an end view of the apparatus with the parts at the right of the line $x\,x$ in Fig. 3 removed, and Fig. 5 is an elevation of the upper end of the pedestal at the opposite end of the apparatus. Fig. 6 is a side view of one pair of filter-sheets with transverse discharge-openings. Fig. 7 is a transverse section of three pairs of such sheets on line $y\,y$ in Fig. 6, the filling between the sheets being omitted. Figs. 8 and 9 are a side view and edge view of one of the eyelets before it is applied to the passage through the pair. Figs. 10 and 11 are a side view and edge view of one of the stud-collars applied to the outlet-support. Figs. 12 and 13 are a side and edge view of one of the packing rings for the outlet-openings.

In Figs. 1 and 2 the filter-sheets $c$ are made circular with their peripheries clamped together upon intermediate collars $a^2$ by clamp-rings $b$ and bolts $b'$. The collar $a^2$ is provided at one side with a nozzle $f$, and a pipe $q$, secured therein, is passed through the cover $g$ of the filter-casing $B^2$, and connected by union $q'$ with the discharge-pipe $h$. Between the pair of sheets $c$ is shown a filling of granular substance $d$, as sand or emery, adapted to sustain the pressure upon the outer sides of the sheets $c$, and to thus prevent the same from rupture, while the spaces between the particles of granular material permit the percolation of the fluid to the outlet $e$. The fluid admitted to the casing by the pipe $B'$ circulates freely around the outside of each pair and presses uniformly over its entire surface.

In Fig. 3 the pairs of filter-sheets are clamped together with collars $a^2$ between the sheets of each pair and other collars $a$ between the several pairs, heads A A' being applied to the end of the series and pressed upon the sheets and collars by tie-rods B, so as to clamp the whole into a single filter. The heads are made cylindrical and rest upon a roller F, fitted to bearings F' in pedestals G, and the filter-casing is provided with axles H H', which also turn in bearings G' in the upper part of the same pedestals. The bearings G' are made with vertical sides, and the weight of the casing rests wholly upon the roller F, so that the rotation of the latter produces a slow rotary motion of the casing. The axles H H' serve as an inlet and outlet to the casing, being formed of pipes which connect with apertures through the heads A A'. A hole $o$ is formed in the center of each pair, and the fluid is prevented from access between the sheets of the pair at such hole by a packing $o^2$, having eyelet $o'$, (shown in Figs. 8 and 9,) which is flanged tightly upon the outer sides of the pair, as shown in Fig. 7. The flanges of the eyelet press the sheets tightly upon the packing $o^2$, and the latter is preferably cemented to the sheets before the eyelet is inserted, so that the joint is absolutely water-tight. The unfiltered fluid passes through all the openings $o$, and thus gains access to the exterior of each pair. The pairs are kept apart by studs $c'$, cemented on. The current of fluid through the apertures $o$ nearest to the inlet-pipe drives the impurities which accumulate in the filter toward the head A', and at such point a waste-cock J is provided to discharge the accumulated impurities from the casing at suitable intervals. By locating the openings $o$ in the center of each sheet the outlet-apertures $e$ are unavoidably formed at one side of the center, and the outlet-pipe H' is therefore bent to the center line outside of the filter-casing. An outlet-aperture $e$ is also formed in each pair, and intermediate washers $e'$, (shown separately in Fig. 13,) made of yielding material, as wood, cork, or india-rubber, are inserted between the pairs at such apertures to connect the whole series with the discharge-pipe H'.

To prevent the collapse of the sheets $c$ under the pressure of the washers $e'$, a perforated disk $i$, like the collars $k$ without the studs $k'$, and a collar $k$, provided with transverse studs $k'$, (shown separately in Figs. 10 and 11,) are placed within the pairs of sheets at the aperture and sustain the pressure of the washers $e'$, while the spaces between the studs $k'$ permit the fluid to pass from the apertures $e$.

In Fig. 3 a pipe $p$ is shown placed within all the apertures $e$ inside the washers $e'$, and extended through the head A' to the discharge-pipe H'; but the pipe is not essential, as the washers $e'$ form a continuous discharge-passage to the casing A', connected with the pipe H'. To cleanse the outer surface of each pair, sand or other abrading material is placed in suitable quantity between each of the pairs, so as to partly fill the intervening space, and by rotating the filter-casing such granular material is caused to abrade in succession the entire surface of the filtering medium, and thus keep it constantly cleansed.

To conveniently rotate the casing, the heads A A' are made cylindrical and supported upon the revolving roller F, and the required motion for the roller may be readily secured by transmitting the fluid to the filter-casing by a rotary motor or pump and connecting its shaft with the said roller. A supply of water under pressure passing through such a rotary pump would thus furnish the filter with the fluid to be filtered, while it would constantly rotate the supporting-roller and cause a rotary movement of the filter-casing to turn all the portions of the filtering medium into successive contact with the granular abrading material.

L is a rotary pump or motor, $l$ its inlet-pipe, and $l'$ its discharge connected with the filter-inlet H. A wheel $m$ is fixed upon the motor-shaft $n$, and the roller F is connected with such shaft, so that the rotation of the pump or motor operates to rotate the roller, and thus turn the filter-casing when the water is supplied thereto. With a supply of water under pressure a rotary motor could be used to feed the filter and rotate its casing, and when it is necessary to lift the water to the filter a belt may be applied to the wheel $m$ to operate the motor as a pump and produce the same results.

I have heretofore claimed in sundry patents combinations of filter-plates connected together at their centers and at their peripheries, and wholly inclosed in a surrounding casing, and do not, therefore, claim such a construction in my present invention.

My present invention differs from any heretofore known in the use of pairs of filter sheets or plates connected together, and to the outer shell of the casing at their peripheries, so that apertures $o$ are required through all the pairs to permit the distribution of the fluid between the same.

I am aware that it is not new to connect two rigid filter-plates together with or without intermediate supporting material, and I do not, therefore, claim such construction; but I am not aware that thin flexible sheets of material which could be readily ruptured have ever been sustained by placing an intermediate packing of porous material between two such plates.

In Fig. 7 the spaces between the sheets are shown entirely empty to exhibit the construction of the packing $o^2$ and the stud-collars more clearly; but such intermediate spaces may be filled with any suitable pervious material through which the fluid can percolate to the outlet-aperture $e$. I have found rice matting a suitable filling for such purpose, as it is adapted to stand considerable pressure, while from the crossing of its fibers it preserves an open channel for the fluid which percolates through the sheets $c$ to reach the apertures $e$, and such matting is so thin that it occupies very little room in the filter, so that many of the pairs of sheets may be comprised in a single foot of length.

To sustain the granular material between the flexible sheets, it may be cemented by a suitable water-proof varnish to a thin plate of metal or other rigid substance. Such plate is shown in the section in Fig. 1 as a plain black line $d'$, with the granular substance adherent to it and in contact with the inner sides of the flexible sheets $c$. The plates of metal are shown simply inserted inside the rims $a^2$ and would be made circular to fit within such rings; but the plates may, if preferred, be made of any other convenient form, and if placed within the filter-sheets shown in Fig. 7 could be made of the same size as the sheets themselves and clamped between their peripheries.

The cement used to affix the granular material to the plates would be of a kind insoluble in the liquid to be filtered, as of glue for filtering alcohol, benzine, &c., and of copal varnish or analogous substance for filtering water.

It is obvious that to produce the rotation of a cylindrical casing, as shown in Fig. 3, the rotary pump or motor L could be connected with the outlet-pipe H' and operate by suction instead of by forcing, the velocity of the filter-casing's rotation being then in the same proportion to the volume of the fluid passed through the filter, as when the pump or motor is connected with the inlet. Fluid discharged from the filter under pressure would also operate the motor without any extraneous power, and thus turn the shaft or roller F, as desired.

Having thus set forth the nature of my invention, what I claim is—

1. The combination, in a filter, of a series of sheets of filtering material clamped together in pairs, with intervening packings between the pairs at their peripheries, heads pressed upon the entire series at its opposite ends, a discharge-pipe, a series of outlet-apertures formed through all the pairs of sheets and connected together and to the discharge-pipe by intermediate packings, and a series of openings formed through all the pairs to distribute the inlet-fluid between the same, as an inlet, as and for the purpose set forth.

2. The combination, in a filter, of a series of sheets of filtering material clamped together in pairs, with intervening packings between the pairs at their peripheries, heads pressed upon the entire series at its opposite ends, a discharge-pipe, loose abrading material inserted in the separate spaces between the pairs, a series of outlet-apertures formed through all the pairs of sheets and connected together and to the discharge-pipe by intermediate packings, an outlet, and a series of openings formed through all the pairs of sheets to distribute the inlet-fluid between the same, as and for the purpose set forth.

3. A filter consisting in a series of pairs of flexible sheets and provided with an outlet-aperture, and a plate of metal having granular material cemented thereto being inserted between the sheets of each pair, as and for the purpose set forth.

In testimony whereof I have hereunto set my hand in the presence of two subscribing witnesses.

JOHN W. HYATT.

Witnesses:
  THOS. S. CRANE,
  FRANK L. MORTON.